United States Patent
Borgarelli et al.

(10) Patent No.: US 6,672,179 B2
(45) Date of Patent: Jan. 6, 2004

(54) BALL SCREW SHAFT, PROVIDED WITH VIBRATION CONTROLLING MEANS

(75) Inventors: Nicola Borgarelli, Ponte San Giovanni (IT); Luciano Pizzoni, Foligno (IT); Federico Perni, Trevi (IT)

(73) Assignee: Umbra Cuscinetti S.p.A., Foligno (IT)

( * ) Notice: Subject to any disclaimer, the term of this patent is extended or adjusted under 35 U.S.C. 154(b) by 55 days.

(21) Appl. No.: 10/025,493

(22) Filed: Dec. 26, 2001

(65) Prior Publication Data

US 2002/0108456 A1 Aug. 15, 2002

(30) Foreign Application Priority Data

Dec. 22, 2000 (IT) ..................... RM2000A0691

(51) Int. Cl.7 ............... F16H 25/20; F16F 7/10
(52) U.S. Cl. ..................... 74/89.36; 188/378
(58) Field of Search ............ 74/89.36; 188/378, 188/379; 248/562, 676

(56) References Cited

U.S. PATENT DOCUMENTS 2,028,930 A * 1/1936 Taylor ................. 188/379
3,128,330 A * 4/1964 Grasser ................ 188/378
5,613,400 A 3/1997 Sato et al.

FOREIGN PATENT DOCUMENTS

| DE | 10 16 510 | 9/1957 |
| JP | 06 011009 | 1/1994 |
| JP | 07-208572 | 8/1995 |
| JP | 07 293659 | 11/1995 |
| SU | 1453099 | 1/1989 |

* cited by examiner

Primary Examiner—Jack Lavinder
Assistant Examiner—Thomas J. Williams
(74) Attorney, Agent, or Firm—Browdy and Neimark

(57) ABSTRACT

A ball screw shaft, having a longitudinal cylindrical internal cavity, closed at its ends by inserted terminals or plugs, housing vibration controlling members in the form of a pair of plied cables fastened tensioned to the inserted terminals or plugs. One or more dissipater elements, having respective through holes for said pair of cables are provided positioned transversely free relative to an inner surface of said longitudinal cavity.

7 Claims, 1 Drawing Sheet

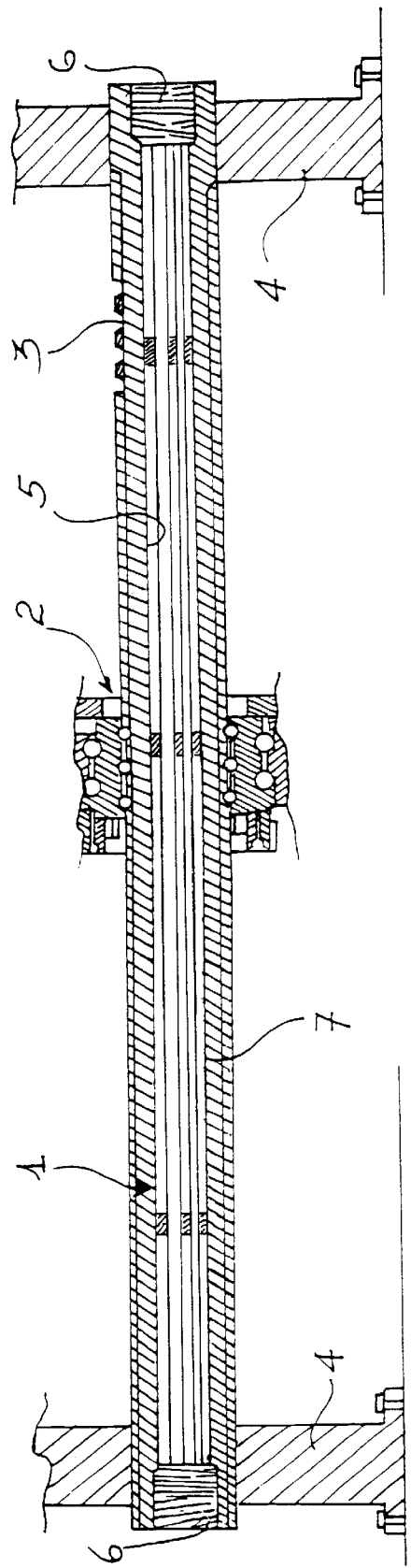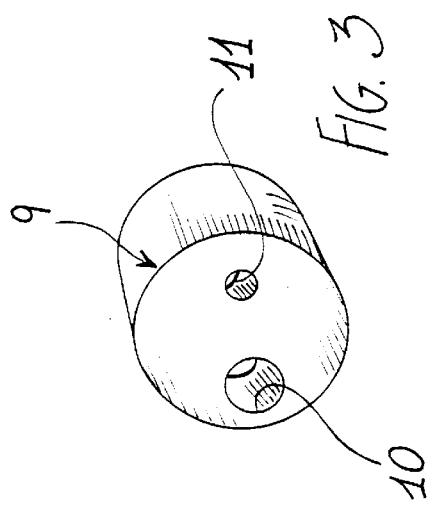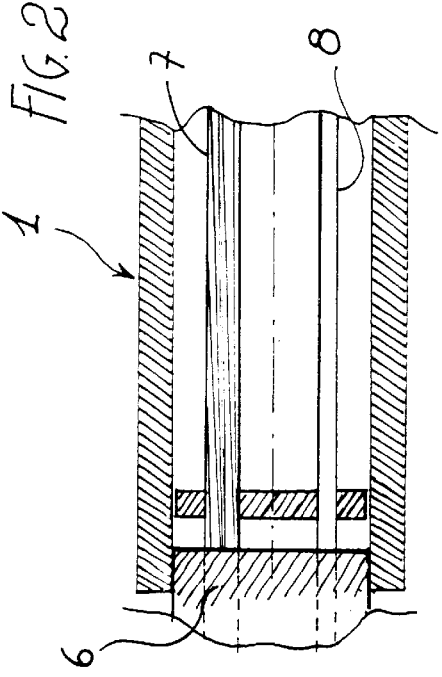

BALL SCREW SHAFT, PROVIDED WITH VIBRATION CONTROLLING MEANS

BACKGROUND OF THE INVENTION

The present invention relates to a ball screw shaft, provided with vibration controlling means, of the kind having a longitudinal cylindrical internal cavity, closed at its ends by means of inserted terminals or plugs.

In ball screw devices of the kind with rotating nut screw, as well as those in which the shaft rotates, the natural vibration frequency of the shaft remains low. Therefore, when the frequency of small vibrations, applied to the shaft by the nut screw through its vibration, are in area of the critical velocity of the shaft, such resonance phenomena occur as to cause large vibrations in the screw shaft because of the great distance between the supports of the shaft.

Within the field of known solutions to the problem, it is found that the unexamined Japanese patent publication N. 6-11009 provides a screw shaft bearing, in one its longitudinal cavity, a long stem serving as vibration controlling mass member, which comes in contact with the inner surface of said cavity when the shaft screw vibrates. Said collision limits the vibration of the screw shaft in its resonance point, which shaft is therefore able to operate at velocities exceeding its critical velocity. However, when the screw shaft is excited at low frequency, the screw shaft and the vibration controlling mass member do not always move relative to each other so as to touch each other, and in the aforementioned patent no concrete means are indicated to allow the screw shaft and the vibration controlling mass element to move in such a way as to expect such a behaviour.

Subsequently, U.S. Pat. No. 5,613,400 has tackled the same problem of damping the transmission of vibrations from a nut screw to a screw shaft to prevent it from resonating and allow an operation with a long travel and high speed. This patent discloses a ball screw device having a screw shaft including a longitudinal internal cavity with a longitudinal vibration controlling mass member within it, held by support bushings, and a damping element interposed between the vibration controlling mass member and the inner surface of the longitudinal cavity of the screw shaft to prevent contact between the vibration controlling mass member and the longitudinal cavity. According to the aforementioned patent, the vibration controlling mass member is constituted by a single rigid steel hold ring fastened to the ends of the screw shaft.

Although said steel hold ring, as a vibration controlling means, is provided associated to various damping and supporting means in different embodiments, nonetheless it cannot provide a satisfactory damping effect in a low frequency area and limit vibrations in a wide range of frequencies in correspondence with the natural frequency of the screw shaft that varies with the position of the nut screw.

SUMMARY OF THE INVENTION

The present invention is therefore aimed at solving the problem stated above, overcoming the limits and drawbacks of the prior art.

Thus, the main aim of the invention is to provide vibration controlling means that are able by themselves to allow a drastic reduction of vibrations, preventing them from reaching a condition of resonance.

Another aim of the invention is to provide dissipater means made of materials with such intrinsic characteristics as to transform the vibration energy into other forms of energy, especially into thermal energy.

The vibration energy content to be transformed is in any case low, so that it does not cause the temperature of the screw shaft to rise.

Thus, the invention provides a ball screw shaft, provided with vibration controlling means, of the kind having a longitudinal cylindrical internal cavity, closed by means of inserted terminals or plugs at the ends of the screw shaft and housing vibration controlling means, which, from a general point of view, is characterized in that said vibration controlling means are constituted by a pair of steel plied cables fastened to said inserted terminals or plugs; one or more dissipater elements, having respective through holes destined to receive in pass-through manner, in predetermined position and distance, said pair of cables, being provided transversely free relative to the inner surface of said longitudinal cavity.

BRIEF DESCRIPTION OF THE DRAWINGS

Further characteristics and advantages of the present invention shall become more readily apparent from the detailed description that follows of a preferred embodiment, illustrated purely by way of non limiting indication, in the accompanying drawings in which:

FIG. 1 shows a longitudinal section of a screw shaft according to the present invention;

FIG. 2 shows an enlarged scale longitudinal section of an end portion of the screw shaft of FIG. 1;

FIG. 3 shows a schematic axonometric view of a dissipater element.

DESCRIPTION OF THE PREFERRED EMBODIMENTS

With reference to FIG. 1, a ball screw shaft is globally indicated with the reference number 1, and a nut screw advancing thereon is indicated with 2. The screw groove of the shaft is indicated only partially with the reference 3, although it should be understood that it is provided over the whole length of the screw shaft 1. The nut screw 2 is also shown only partially and it is not described, as it is a wholly conventional device. Purely by way of example, the screw shaft is supported by end stands generally indicated with the number 4, but obviously they can be replaced with other support means depending on the application. The shaft 1 has a longitudinal cylindrical internal cavity 5, which is closed at its ends by means of inserted terminals or plugs generically indicated with the number 6, hereinafter for the sake of simplicity referred to only as terminals. Inside the longitudinal cavity 5, according to the invention, vibration controlling means are constituted by a pair of steel plied cables, indicated with the reference number 7 and, respectively, 8.

The cables 7 and 8 are positioned parallel, held tensioned at the ends by effect of a pre-tensioning obtained when mounting the terminals 6. The cables 7 and 8 are fastened to the terminals 6 in predetermined distanced positions.

The cables are mutually distanced with one or more dissipater elements 9, preferably in the form of disks of elastomeric material. They are destined to receive in pass-through fashion through respective holes 10 and 11 (FIG. 3), in predetermined position and distance, the pair of cables 7 and 8, being positioned transversely relative to the inner surface of the longitudinal cavity 5 (FIG. 1).

The cables 7 and 8 may be made to have equal diameters but preferably have different diameters to guarantee the onset of mutually different vibratory phenomena, able to activate the dissipaters made of elastomeric material.

The cables themselves, because of their plied configuration, are systems with high internal damping.

Additional, the presence of oil, particulate or other dissipating materials can be provided, to fill the free cavity between the cables and the inner wall of the longitudinal cavity 5 of the shaft and thereby enhance internal damping.

To demonstrate the improvements obtained with respect to the prior art, comparison tests were conducted on known screw shafts and a screw shaft according to the present invention.

For the tests, a test bench was selected in which the screw shaft is locked in place at the end with respective hydraulic vices. During each test the screw shaft was subjected to impact stress using an instrumented hammer PCB 086B04 with rubber tip. The response of the screw shaft was measured with a piezoelectric accelerometer whose natural frequency is equal to 51 kHz. The piezoelectric accelerometer was positioned at the centre of the screw, where acceleration is greatest. Both the signal of the instrumented hammer (force signal) and that of the accelerometer (acceleration and displacement signal) were sampled. To improve signal-to-noise ratio, multiple-sample averages were obtained for each measurement point.

Analysing the results of the tests performed on the screw shaft according to the present invention, compared to the results on the prior art screw shaft, a considerable increase was noted in the internal damping of the system: displacement amplitude rapidly drops to nil about 0.9 seconds after the hammer blow.

Naturally, the invention thus conceived can be subject to numerous modifications and variations, without thereby departing from the scope of the inventive concept.

What is claimed:

1. A ball screw shaft, provided with vibration controlling means, the shaft having a longitudinal cylindrical internal cavity, closed by means of inserted terminals or plugs at ends of the screw shaft and housing vibration controlling means within the cavity, wherein said vibration controlling means are constituted by a pair of parallel steel plied cables fastened tensioned to said inserted terminals or plugs, one or more dissipater elements having respective through holes destined to receive said pair of cables in a pass-through fashion at a predetermined position and distance apart from the terminals or plugs, said pair of parallel steel cables being positioned transversely to said dissipater elements and open relative to an inner surface of said longitudinal cavity.

2. The screw shaft as claimed in claim 1, wherein said cables have equal diameter.

3. The screw shaft as claimed in claim 1, wherein said cables have different diameters.

4. The screw shaft as claimed in claim 1, wherein said dissipater elements are disk shaped.

5. The screw shaft as claimed in claim 1, wherein said dissipater elements are made of elastomeric material.

6. The screw shaft as claimed in claim 1, wherein said longitudinal cavity which is open between the cables and the inner wall of the shaft, is filled with dissipating material able to enhance internal vibration damping.

7. The screw shaft as claimed in claim 1, wherein the pair of cables are parallel to the axis of the internal cavity.

* * * * *